(12) United States Patent
Harless et al.

(10) Patent No.: US 8,354,087 B2
(45) Date of Patent: Jan. 15, 2013

(54) METHOD FOR REMOVAL OF HYDROGEN SULFIDE FROM GEOTHERMAL STEAM AND CONDENSATE

(75) Inventors: Michael L. Harless, Humble, TX (US); Daniel K. Durham, The Woodlands, TX (US)

(73) Assignee: Multi-Chem Group, LLC, San Angelo, TX (US)

( * ) Notice: Subject to any disclaimer, the term of this patent is extended or adjusted under 35 U.S.C. 154(b) by 53 days.

(21) Appl. No.: 13/132,829

(22) PCT Filed: Dec. 7, 2009

(86) PCT No.: PCT/US2009/006402
§ 371 (c)(1),
(2), (4) Date: Jun. 3, 2011

(87) PCT Pub. No.: WO2010/065142
PCT Pub. Date: Jun. 10, 2010

(65) Prior Publication Data
US 2011/0236281 A1   Sep. 29, 2011

Related U.S. Application Data

(60) Provisional application No. 61/200,978, filed on Dec. 5, 2008.

(51) Int. Cl.
*B01D 53/52* (2006.01)
(52) U.S. Cl. .................................. 423/226; 423/DIG. 19
(58) Field of Classification Search .................. 423/226, 423/DIG. 19
See application file for complete search history.

(56) References Cited

U.S. PATENT DOCUMENTS

| | | | |
|---|---|---|---|
| 4,361,487 A | 11/1982 | Hills et al. | |
| 4,468,929 A | 9/1984 | Jernigan | |
| 4,629,799 A | 12/1986 | Goetz et al. | |
| 4,680,127 A | 7/1987 | Edmondson | |
| 4,930,316 A | 6/1990 | Bonham, Jr. | |
| 5,543,122 A | 8/1996 | Hammond et al. | |
| 2008/0056971 A1 | 3/2008 | Hughes | |
| 2011/0236281 A1* | 9/2011 | Harless et al. | 423/226 |

OTHER PUBLICATIONS

Extended European Search Report for European Application No. 09830737.4, mailed on May 21, 2012 (5 pages).
International Search Report for International Application No. PCT/US09/06402, mailed on Mar. 3, 2010 (1 page).

* cited by examiner

*Primary Examiner* — Timothy Vanoy
(74) *Attorney, Agent, or Firm* — Robert A. Kent; Adolph Locklar

(57) ABSTRACT

A method for scavenging hydrogen sulfide from geothermal steam in a condenser under vacuum. A fine curtain of atomized acrolein-water droplets may be sprayed into geothermal steam condensers in an amount of approximately 2:1 molar ratio of acrolein to $H_2S$ based on hydrogen sulfide in the incoming steam from the turbine. The range being approximately 0.1 ppm to 500 ppm of sulfide. The acrolein is allowed to react with the gas phase $H_2S$ to form non-volatile aldehyde byproducts which partition into the water phase, are returned to the cooling tower and ultimately removed by normal cooling-tower blow down.

5 Claims, 1 Drawing Sheet

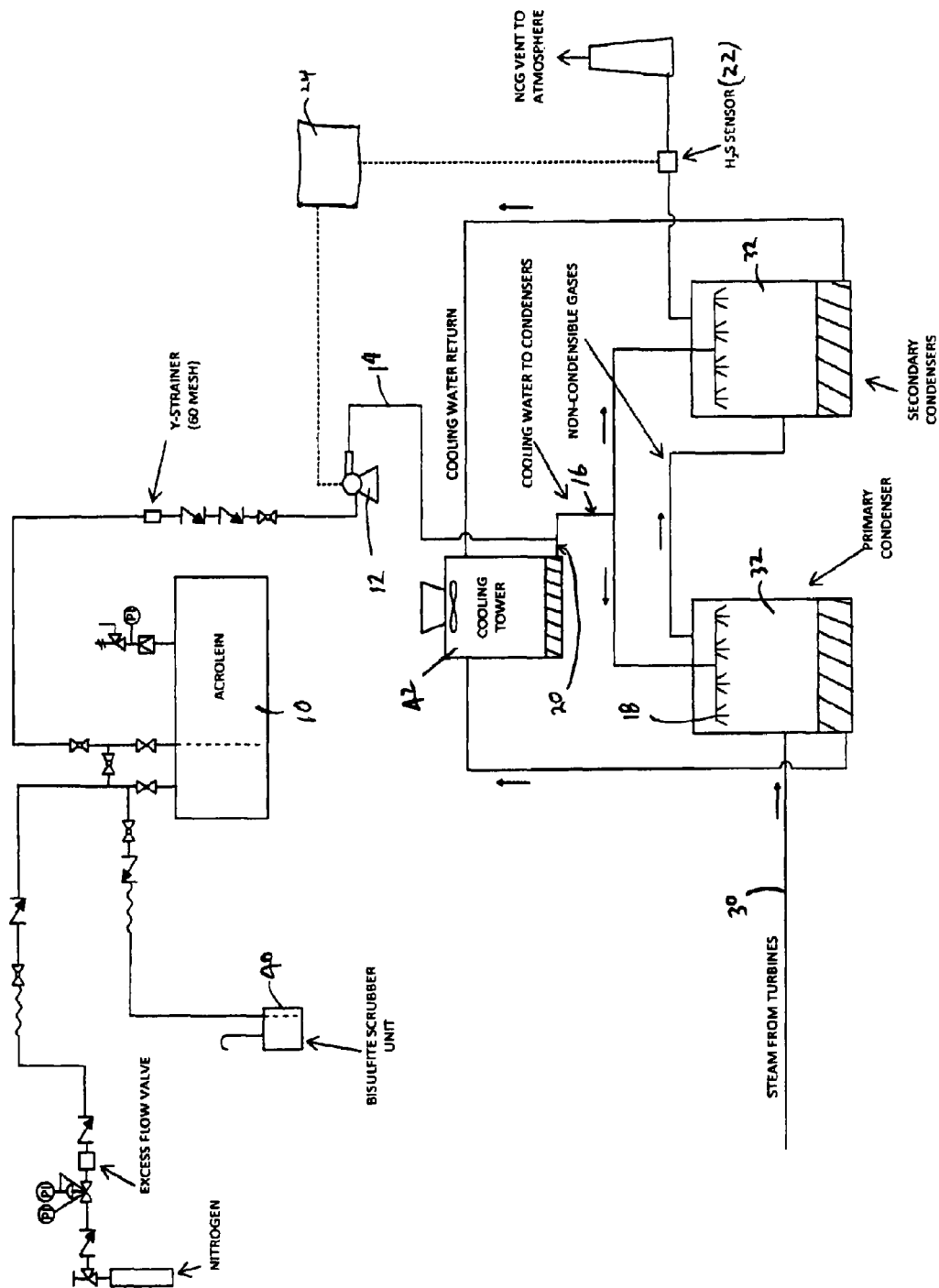

METHOD FOR REMOVAL OF HYDROGEN SULFIDE FROM GEOTHERMAL STEAM AND CONDENSATE

This application claims priority to U.S. Provisional Patent Application Ser. No. 61/200,978, filed Dec. 5, 2008.

BACKGROUND

Geothermal heat originating from the earth's core is a "renewable" source of energy. The magma below the earth's crust heats nearby rocks and water. Hot geothermal effluent comprised of water and steam travels through faults and cracks to the earth's surface as geysers. Geysers in northern California are currently sources for geothermal energy plants. However, most hot geothermal water stays deep underground trapped in geothermal reservoirs and must be brought to the surface via a drilled production well if it is to be productively used.

A geothermal power plant is a thermal plant which uses geothermal resources as its principal source for generation of electrical power. A geothermal effluent is the effluent which is heated by geothermal heat and used to power the geothermal power plant. There are basically three kinds of geothermal power plants which utilize this hot water/steam in geothermal reservoirs as a geothermal effluent. A "dry" steam reservoir produces steam, but very little water. This steam is piped directly to a "dry" steam power plant to provide the force to spin a turbine generator.

A geothermal reservoir that produces mostly hot water ranging in temperature from 300-200 degrees F. is used in a "flash" power plant. This high temperature water is brought to the surface and released from the pressure of the reservoir; flashing into steam in a separator. The steam drives turbines.

In a third kind of plant, called a "binary" power plant, geothermal water between 250-360 degrees F. is passed through a heat exchanger where its heat is transferred to a second (binary) liquid that boils at a lower temperature than water. When heated, the binary liquid flashes to vapor which expands and spins turbine blades.

In all of these types of plants, the geothermal effluent comprised water or steam may contain varying amounts of hydrogen sulfide ($H_2S$) which, if not properly disposed, may cause environmental, health, and safety problems. In the "dry" and "flash" plants, the exhaust from the power plant turbine generally passes through a condenser which produces a condensate stream and a non-condensable gas stream which contain varying amounts of hydrogen sulfide ($H_2S$). In the binary plant, the "cool" geothermal fluid is re-injected into the production formation. This fluid contains hydrogen sulfide and may be treated prior to re-injection.

Typical ways of removing hydrogen sulfide from geothermal effluent are by injecting oxidizing agents such as peroxides or hypochlorite; using an amine removal system; absorption into water; or injecting triazine based products. Oxidizing agents are corrosive and may result in formation of solids that may cause operational problems. Amine systems are efficient, but require a large capital investment.

Absorption of hydrogen sulfide into water streams results in toxic water that has the potential to subsequently release hydrogen sulfide into the atmosphere. Triazines are inefficient when injected directly into an aqueous system and require large volumes of chemical to be effective or require large capital investments if used on non-condensed steam.

BRIEF DESCRIPTION OF THE DRAWINGS

FIG. 1 illustrates a flow diagram of the present method of injection of acrolein into the cooling water for reaction with $H_2S$ in the condenser.

DETAILED DESCRIPTION OF A PREFERRED EMBODIMENT

The described process relates to the use of acrolein to remove or scavenge hydrogen sulfide from geothermal steam. Acrolein (2-propenal or $C_3H_4O$) is an unsaturated aldehyde. It is most often prepared industrially by oxidation of propene, but is also formed when glycerol is heated to 280° C. Acrolein is used in the preparation of polyester resin, polyurethane, propylene glycol, acrylic acid, acrylonitrile, and glycerol. It is also used as a pesticide to control algae, weeds, bacteria, and mollusks.

Acrolein has been used as a hydrogen sulfide scavenger in the treatment of produced fluids from oil and gas production operations by direct injection into the bulk liquid phases. However, these methods have been unsuitable for use in a geothermal steam context or have required that acrolein be added in cost prohibitive amounts to effectively reduce the hydrogen sulfide levels in a geothermal steam context.

Treatment of geothermal steam to remove hydrogen sulfide as described in the instant invention presents additional and different requirements. These requirements involve the application of acrolein in aqueous solution in such a manner to allow acrolein to contact hydrogen sulfide gas in vapor phase to allow reaction to occur in the very limited time frame available in steam condenser systems. The described process is an effective, economical process for treatment of geothermal stream and condensate to meet required $H_2S$ emission standards in a geothermal power plant.

This invention concerns removal of hydrogen sulfide from the steam produced from geothermal electrical power generating facilities. Typically, steam exiting a geothermal power plant turbine passes through a number of condenser vessels in series. In one variety of condenser, the steam is condensed by injecting cooling water into the steam with non-condensable gases being vented to an exhaust stack downstream of the last condenser in series. When the condensers are operated at low pressure, near vacuum, or at vacuum, as is often the case, many gases, including hydrogen sulfide, do not extensively partition into the aqueous phase. In some circumstances this results in a concentration of 40,000 ppm of $H_2S$ in the vapor phase and a concentration of only 1 ppm of $H_2S$ in the aqueous phase. Due to this phenomenon, typical aqueous phase reactions in the bulk water of such condenser systems have not been an effective way to remove $H_2S$ from geothermal effluent in geothermal power plants.

The use of acrolein to remove hydrogen sulfide from geothermal steam and condensate in the manner described herein requires little capital. The reaction kinetics are favorable. The reaction products are stable and do not regenerate hydrogen sulfide at a later point in the process. The reaction products of the described process are water soluble and do not result in solids formation that cause disposal issues or operational problems downstream of the injection point.

The basic chemical reactions underlying the described process are as follows (Reaction 1 will predominate):

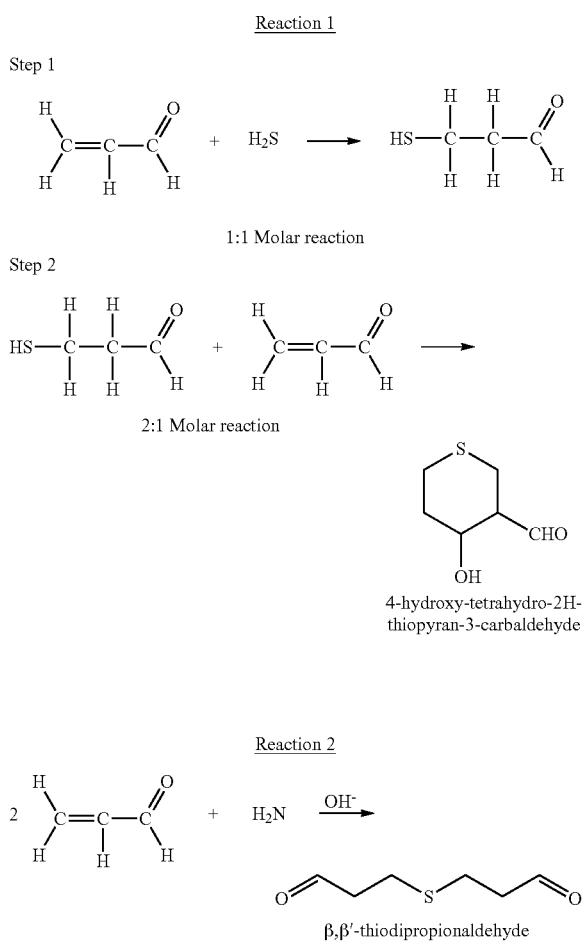

The described process steps involve the use of typical condenser equipment plus standard chemical pumps, piping, sensors, and process controllers for using acrolein in the described process to remove hydrogen sulfide.

FIG. 1 illustrates a flow chart for the present inventive process. The described process is capable of usefully removing hydrogen sulfide from the non-condensable gas phase. As may be seen in FIG. 1, a reservoir 10 containing acrolein is connected via an injunction pump 12 and piping 14 to the flowline 16 conducting cooling water to the condenser's spray nozzle 18. The acrolein may be injected directly into the cooling water sump outlet line 20 to the condenser vessels 32 using chemical injection pumps or other means (e.g. nitrogen pressure, etc.) to introduce the acrolein into the water flow. Pre-existing equipment already at geothermal plants, including turbine, condenser, cooling tower, etc., are shown schematically in FIG. 1.

It will be understood by one of ordinary skill in the art from FIG. 1 that geothermal steam 30 from the power plant turbines is introduced in the condensers 32 for condensation. $H_2S$ in the non-condensable gas (NCG) influent may vary from less than 10 ppm to percent levels (>40,000 ppm has been observed). The level of $H_2S$ in the influent is dependent on the geological formation or field from which the steam is being produced.

Ideal effluent $H_2S$ concentrations would be less than 1.0 ppm, with preferred concentration of less than 10 ppm. Greater concentrations may be acceptable depending upon prevailing regulations and policy.

FIG. 1 shows a $H_2S$ sensor 22 measuring $H_2S$ concentrations in the non-condensable gas (NCG) effluent stream to supply data to the injection pump controller 24 to adjust the injection rate of acrolein via injection pump 12 to optimal levels. Standard monitors, controllers, meters, and pumps, well-known in the art, may be used to regulate acrolein injection rates.

The acrolein supply system shown in FIG. 1 utilizes nitrogen pressure to deliver acrolein to the injection pump 12. FIG. 1 also illustrates a bisulfate scrubber unit 40 which is used to neutralize vapors when the acrolein reservoir 10 is depressurized. Acrolein is injected with the cooling water through spray nozzles 18 into one or more condensers 32. Cooling tower 42 may use fresh water fill and/or make up water from the condenser 32 sumps. The injection through the spray nozzles creates a curtain of fine acrolein-water droplets. A reaction of acrolein with hydrogen sulfide occurs as a result of the large hydrogen sulfide gas phase-acrolein water phase interface created by spraying the curtain of atomized acrolein-water droplets into the hydrogen sulfide gas in the condenser under vacuum. This large gas phase-water phase surface area provides adequate contact between the aqueous phase acrolein molecules and the vapor phase hydrogen sulfide molecules for a quantitatively useful reaction between them to occur. This is a novel and non—obvious aspect of the present inventive process which is different than the reaction of acrolein in bulk aqueous/liquid phases. Further, the reaction of acrolein with $H_2S$ at this sulfide gas phase-acrolein water phase is at temperatures low enough (approximately 250° F.) to avoid the high temperature which may degrade the acrolein molecule.

Acrolein reacts with hydrogen sulfide at a 2:1 molar ratio. Accordingly, the theoretical ratio of acolein:hydrogen sulfide is 3.29:1 (w/w). In practical application, in the area of the condenser where the reaction is occurring, the ratio of acrolein to $H_2S$ may vary from 0.1 ppm of acrolein per 1.0 ppm of hydrogen sulfide to 20 ppm of acrolein per 1.0 ppm of hydrogen sulfide.

Additional acrolein may be required to overcome chemical demand imposed by ammonia or other primary amines. Prior to starting a treatment program, tests are conducted to anticipate these excess demands.

The acrolein-hydrogen sulfide reaction product is non-volatile and will partition into the water (aqueous) phase to be returned to the cooling tower 42 where it is ultimately removed from the system by normal cooling tower blow down.

As an example of the present inventive process, it is anticipated that to treat 1,000 metric tons/hour of steam containing 45 ppm of $H_2S$, 180 kg/hour of acrolein will be required. Again, it should be understood that amount of acrolein required will vary dependent upon the influent $H_2S$ levels and the effluent levels mandated by regulation or policy.

While the systems and methods of this invention have been described in terms of preferred embodiments, it will be apparent to those of skill in the art that variations may be applied to the systems, methods, and in the steps or in the sequence of steps of the method described herein without departing from the concept, spirit and scope of the invention. More specifically, it will be apparent that certain materials that are both functionally and mechanically related might be substituted for the materials described herein while the same or similar results would be achieved. All such similar substitutes and modifications to those skilled in the art are deemed to be within the spirit, scope and concept of the invention as defined by the appended claims.

The invention claimed is:

1. A method for removal of hydrogen sulfide from geothermal steam in a condenser comprising the steps of:

injecting acrolein in an effective amount into cooling water sprayed into said condenser to provide within said condenser a curtain of fine water droplets containing said acrolein in an aqueous phase;

allowing said fine water droplets containing said acrolein in an aqueous phase to react with vapor phase hydrogen sulfide in said geothermal steam in said condenser to produce 4-hydroxyl-tetrahydro-2H-triopyran-3-carbaldehyde and β,β'-thiodipropionaldehyde byproducts; and disposing of said byproducts in a non-volatile aqueous phase.

2. The method of claim 1, wherein said effective amount of acrolein is a 2:1 molar ratio of acrolein to hydrogen sulfide.

3. The method of claim 1, wherein said condenser is under vacuum.

4. The method of claim 1, wherein said reaction of said acrolein in said aqueous phase with said vapor phase of said hydrogen sulfide is at a temperature of approximately 250° F.

5. The method of claim 1, wherein said effective amount of acrolein is in the range of approximately 0.1 ppm to approximately 20 ppm per hydrogen sulfide (w/w).

* * * * *